US012672147B2

(12) United States Patent
Li et al.

(10) Patent No.: US 12,672,147 B2
(45) Date of Patent: Jun. 30, 2026

(54) INFORMATION DETECTION METHOD, INFORMATION SENDING METHOD, TERMINAL, AND NETWORK DEVICE

(71) Applicant: VIVO MOBILE COMMUNICATION CO., LTD., Dongguan (CN)

(72) Inventors: Gen Li, Dongguan (CN); Xiaodong Shen, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 963 days.

(21) Appl. No.: 17/894,137

(22) Filed: Aug. 23, 2022

(65) Prior Publication Data

US 2022/0408418 A1 Dec. 22, 2022

Related U.S. Application Data

(63) Continuation of application No. PCT/CN2021/077212, filed on Feb. 22, 2021.

(30) Foreign Application Priority Data

Feb. 24, 2020 (CN) .......................... 202010112172.3

(51) Int. Cl.
 *H04W 72/23* (2023.01)
 *H04L 1/00* (2006.01)
(52) U.S. Cl.
 CPC ........... *H04W 72/23* (2023.01); *H04L 1/0038* (2013.01)

(58) Field of Classification Search
None
See application file for complete search history.

(56) References Cited

U.S. PATENT DOCUMENTS

| | | | |
|---|---|---|---|
| 2014/0133427 A1 | 5/2014 | Kim et al. | |
| 2015/0009937 A1 | 1/2015 | Li | |
| 2016/0174204 A1 | 6/2016 | Yang et al. | |
| 2016/0242150 A1* | 8/2016 | Kang | .................... H04L 5/0044 |
| 2018/0234969 A1* | 8/2018 | Wang | .................... H04L 5/0053 |
| 2019/0182807 A1* | 6/2019 | Panteleev | ............. H04L 5/0048 |
| 2019/0261326 A1 | 8/2019 | Xu | |

(Continued)

FOREIGN PATENT DOCUMENTS

| | | |
|---|---|---|
| CN | 102404076 A | 4/2012 |
| CN | 107006041 A | 8/2017 |

(Continued)

OTHER PUBLICATIONS

Extended European Search Report issued in related European Application No. 21760103.8, mailed Jul. 20, 2023, 19 pages.

(Continued)

*Primary Examiner* — Andre Tacdiran
(74) *Attorney, Agent, or Firm* — IPX PLLC

(57) ABSTRACT

Embodiments of the present disclosure provide an information detection method, an information sending method, a terminal, and a network device. The information detection method includes: performing blind detection of information in a candidate Physical Downlink Control Channel (PDCCH) group set. The candidate PDCCH group set is determined according to a candidate PDCCH set of each of multiple pieces of sub-search-space.

18 Claims, 3 Drawing Sheets

101

Perform blind detection of information in a candidate PDCCH group set

(56)          References Cited

U.S. PATENT DOCUMENTS

| | | | |
|---|---|---|---|
| 2019/0297577 A1* | 9/2019 | Lin .................... | H04W 52/0235 |
| 2019/0335425 A1* | 10/2019 | Seo ........................ | H04L 5/0053 |
| 2020/0008235 A1 | 1/2020 | Sarkis et al. | |
| 2020/0029310 A1 | 1/2020 | Lee et al. | |
| 2020/0205150 A1* | 6/2020 | Cheng ................... | H04W 72/21 |
| 2021/0037506 A1 | 2/2021 | Yoshimura et al. | |
| 2021/0320821 A1 | 10/2021 | Lee et al. | |
| 2021/0391955 A1* | 12/2021 | He ......................... | H04L 5/0053 |
| 2022/0124686 A1* | 4/2022 | Lee ........................ | H04L 5/0094 |
| 2022/0132341 A1* | 4/2022 | Lee ........................ | H04L 5/0053 |
| 2022/0279442 A1* | 9/2022 | Luo ................... | H04W 52/0235 |

FOREIGN PATENT DOCUMENTS

| | | |
|---|---|---|
| CN | 108282291 A | 7/2018 |
| CN | 109392151 A | 2/2019 |
| CN | 109660315 A | 4/2019 |
| CN | 110324127 A | 10/2019 |
| CN | 110351002 A | 10/2019 |
| CN | 110351746 A | 10/2019 |
| CN | 110621073 A | 12/2019 |
| CN | 110662228 A | 1/2020 |
| EP | 3610688 A1 | 2/2020 |
| EP | 3642994 A1 | 2/2023 |
| KR | 20190031097 A | 3/2019 |
| WO | 2018137517 A1 | 8/2018 |
| WO | 2019049559 A1 | 3/2019 |
| WO | 2019192018 A1 | 10/2019 |
| WO | 2020032773 A1 | 2/2020 |

OTHER PUBLICATIONS

First Office Action issued in related Korean Application No. 10-2022-7029090, mailed Sep. 13, 2023, 5 pages.

International Search Report issued in corresponding International Application No. PCT/CN2021/077212, mailed May 12, 2021, 4 pages.

First Office Action issued in related Chinese Application No. 202010112172.3, mailed Jan. 21, 2022, 9 pages.

* cited by examiner

```
                                                                    101
  Perform blind detection of information in a candidate PDCCH group set
```
FIG. 1
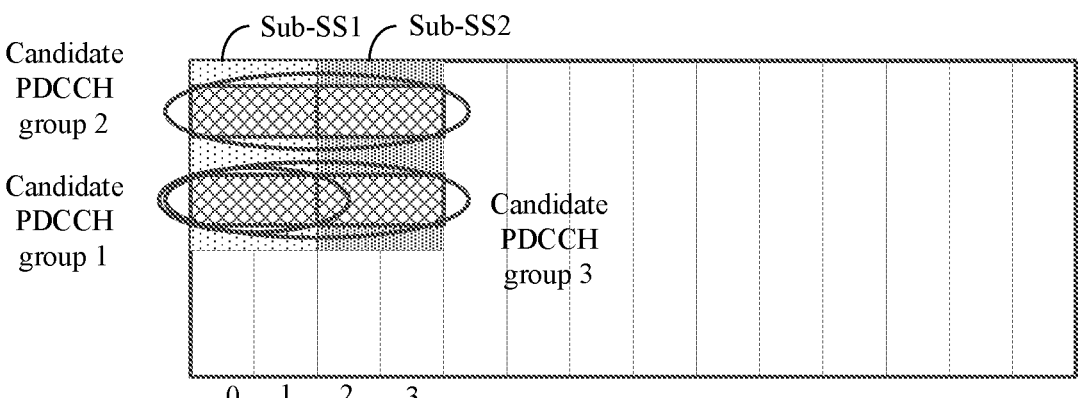
FIG. 2
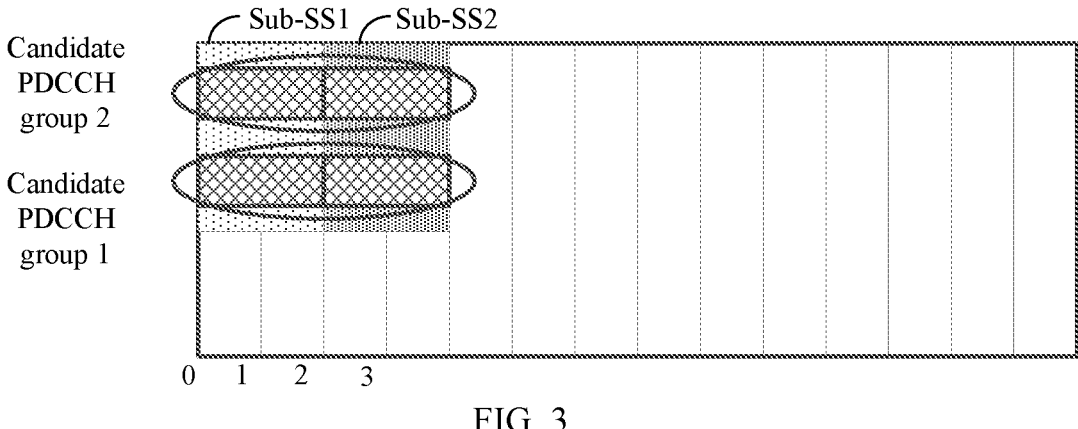
FIG. 3
```
                                                                    401
  Send information to a terminal by using a candidate PDCCH group set
```
FIG. 4

INFORMATION DETECTION METHOD, INFORMATION SENDING METHOD, TERMINAL, AND NETWORK DEVICE

CROSS-REFERENCE TO RELATED APPLICATIONS

This application is a continuation of International Application No. PCT/CN2021/077212, filed on Feb. 22, 2021, which claims priority to Chinese Patent Application No. 202010112172.3, filed on Feb. 24, 2020. The entire contents of each of the above-referenced applications are expressly incorporated herein by reference.

TECHNICAL FIELD

The present disclosure relates to the field of communication technologies, and in particular to an information detection method, an information sending method, a terminal, and a network device.

BACKGROUND

In the prior art, generally, information in a Physical Downlink Control Channel (PDCCH) can only be sent and received independently, and repeated sending and reception of the PDCCH are not supported. Therefore, reliability for PDCCH transmission is poor.

SUMMARY

Embodiments of the present disclosure provide an information detection method, an information sending method, a terminal, and a network device.

The embodiments of the present disclosure are implemented as follows:

According to a first aspect, an embodiment of the present disclosure provides an information detection method, applied to a terminal and including:

performing blind detection of information in a candidate PDCCH group set, where the candidate PDCCH group set is determined according to a candidate PDCCH set of each of multiple pieces of sub-search-space configured for the terminal.

According to a second aspect, an embodiment of the present disclosure provides an information sending method, applied to a network device and including:

sending information to a terminal by using a candidate PDCCH group set, where the candidate PDCCH group set is determined according to a candidate PDCCH set of each of multiple pieces of sub-search-space configured for the terminal.

According to a third aspect, an embodiment of the present disclosure provides a terminal, including:

a detecting module, configured to perform blind detection of information in a candidate PDCCH group set, where the candidate PDCCH group set is determined according to a candidate PDCCH set of each of multiple pieces of sub-search-space configured for the terminal.

According to a fourth aspect, an embodiment of the present disclosure provides a network device, including:

a sending module, configured to send information to a terminal by using a candidate PDCCH group set, where the candidate PDCCH group set is determined according to a candidate PDCCH set of each of multiple pieces of sub-search-space configured for the terminal.

According to a fifth aspect, an embodiment of the present disclosure provides a communications device, including a processor, a memory, and a computer program that is stored in the memory and that can be run on the processor, where when the computer program is executed by the processor, steps of the foregoing information detection method are implemented, or steps of the foregoing information sending method are implemented. In some embodiments, the communications device may be a terminal or a network device.

According to a sixth aspect, an embodiment of the present disclosure provides a computer-readable storage medium, where a computer program is stored on the computer-readable storage medium, and when the computer program is executed by a processor, steps of the foregoing information detection method are implemented, or steps of the foregoing information sending method are implemented.

According to a seventh aspect, an embodiment of the present disclosure further provides a computer software product, where the computer software product is stored in a non-volatile storage medium, and the software product is configured to be executed by at least one processor to implement the steps of the foregoing information detection method or the steps of the foregoing information sending method.

According to an eighth aspect, an embodiment of the present disclosure further provides a communications device, where the communications device is configured to performing the foregoing information detection method or the foregoing information sending method.

In the embodiments of the present disclosure, the terminal can perform blind detection of information in the candidate PDCCH group set, and the candidate PDCCH group set is determined according to a candidate PDCCH set of each of the multiple pieces of sub-search-space configured for the terminal. Therefore, the terminal can perform repeated reception of information on multiple PDCCHs, thereby improving reliability for PDCCH transmission.

BRIEF DESCRIPTION OF DRAWINGS

The technical solutions of the embodiments of the present disclosure are described together with the accompany drawing. The following briefly describes the accompanying drawings. Apparently, the accompanying drawings in the following description show merely some embodiments of the present disclosure, and a person of ordinary skill in the art may still derive other drawings from these accompanying drawings without creative efforts.

FIG. 1 is a flowchart of an information detection method according to an embodiment of the present disclosure;

FIG. 2 is a first schematic diagram of a candidate PDCCH group according to an embodiment of the present disclosure;

FIG. 3 is a second schematic diagram of the candidate PDCCH group according to an embodiment of the present disclosure:

FIG. 4 is a flowchart of an information sending method according to an embodiment of the present disclosure;

DETAILED DESCRIPTION

Figures 5, 6:
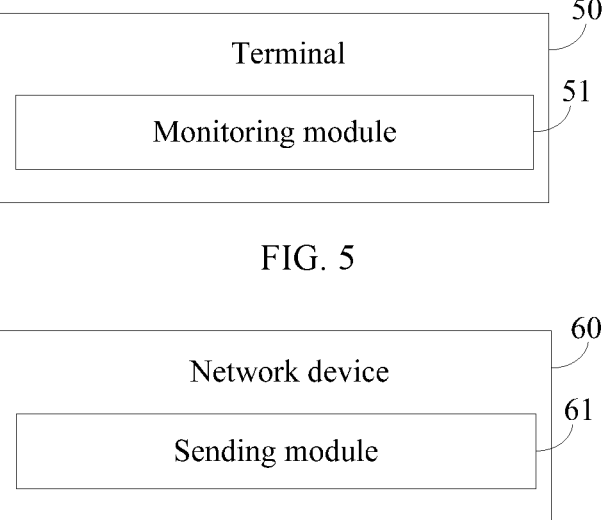
FIG. 5 is a first schematic structural diagram of a terminal according to an embodiment of the present disclosure.
FIG. 6 is a first schematic structural diagram of a network device according to an embodiment of the present disclosure.

To describe the technical solutions of the embodiments of the present disclosure more clearly, the following briefly describes the accompanying drawings required for the embodiments of the present disclosure. Apparently, the accompanying drawings in the following description show merely some embodiments of the present disclosure, and a person of ordinary skill in the art may still derive other drawings from these accompanying drawings without creative efforts.

Terms "first", "second", or the like in the specification and claims of this application are used to distinguish similar objects, instead of describing a specific sequence or order. It should be understood that the data termed in such way is interchangeable in proper circumstances so that the embodiments of this application described herein can be implemented in an order other than the order illustrated or described herein. In addition, terms "include" and "have" as well as any of their variants are intended to cover non-exclusive inclusion. "And/or" used in the specification and claims means at least one of the connected objects.

In some embodiments, a wireless communications system in the embodiments of the present disclosure includes a terminal and a network device. The terminal may also be referred to as a terminal device or a User Equipment (UE). The terminal may be a terminal side device such as a mobile phone, a tablet personal computer, a laptop computer, a Personal Digital Assistant (PDA), a Mobile Internet Device (MID), a wearable device, or a vehicle-mounted device. It should be noted that a specific type of the terminal is not limited in the embodiments of the present disclosure. The network device may be a base station or a core network. The base station may be a fifth generation (5G) base station and a base station of a later version (for example, a gNB, a 5G New Radio (NR) NodeB (NB)), or a base station (for example, an evolved NodeB (eNB), a Wireless Local Area Network (WLAN) access point, or another access point) in another communications system. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an eNB, a home NodeB, a home evolved NodeB, a WLAN access point, a Wireless Fidelity (WiFi) node, or another proper term in the art provided that a same technical effect can be achieved. This is not limited to specific technical terms.

It should be noted that, in the embodiments of the present disclosure, a "number" may also be referred to as an "index". For example, a number of sub-search-space can be called an index of the sub-search-space; a number of a CORESET can be called an index of the CORESET; a number of a CORESET POOL can be called an index of the CORESET POOL; and a number of a candidate PDCCH can be called an index of the candidate PDCCH index; and the like.

Referring to FIG. 1, FIG. 1 is a flow chart of an information detection method according to an embodiment of the present disclosure. The method is applied to a terminal. As shown in FIG. 1, the method includes the following steps:

Step 101: Perform blind detection of information in a candidate PDCCH group set.

In some embodiments, the candidate PDCCH group set may be determined according to a candidate PDCCH set of each of multiple pieces of sub-search-space configured for the terminal. The candidate PDCCH group set may include one or more candidate PDCCH groups. For example, the candidate PDCCH group set may include three candidate PDCCH groups, such as candidate PDCCH group 1, candidate PDCCH group 2, and candidate PDCCH group 3; or the candidate PDCCH group set may include two candidate PDCCH groups, such as candidate PDCCH group 4 and candidate PDCCH group 5.

Candidate PDCCH groups included in the candidate PDCCH group set may include one candidate PDCCH or may include multiple candidate PDCCHs. For example, a candidate PDCCH group set includes the candidate PDCCH group 1 and the candidate PDCCH group 2, and the candidate PDCCH group 1 includes three candidate PDCCHs, and the candidate PDCCH group 2 includes one candidate PDCCH.

In an implementation manner, the terminal can receive configuration information of multiple pieces of sub-search-space sent by a network device, determine a candidate PDCCH set of each piece of sub-search-space according to the configuration information, determine the candidate PDCCH group set according to the determined candidate PDCCH set of each piece of sub-search-space, and perform blind detection of information in the candidate PDCCH group set.

In another implementation manner, the terminal can perform blind detection of a single piece of Downlink Control Information (DCI) in the candidate PDCCH group set.

In the information detection method according to this embodiment of the present disclosure, the terminal can perform blind detection of information in the candidate PDCCH group set, and the candidate PDCCH group set is determined according to a candidate PDCCH set of each of multiple pieces of sub-search-space configured for the terminal. Therefore, the terminal can perform repeated reception of information on multiple PDCCHs, thereby improving reliability of PDCCH transmission.

In this embodiment of the present disclosure, the multiple pieces of sub-search-space configured for the terminal may include the following conditions:

(1) Each piece of sub-search-space includes each CORESET in multiple Control Resource Sets (CORESETs) and a monitoring occasion corresponding to each CORESET. The multiple CORESETs are associated with a single piece of Search Space (SS) association.

(1) can be understood as: a piece of search space is configured to be associated with the multiple CORESETs, and each CORESET and its own corresponding monitoring occasion constitute one piece of sub-search-space (Sub-SS).

In some embodiments, the multiple CORESETs may have (that is, be limited to) a same Transmission Configuration Indicator (TCI) status identifier (ID). In some alternative embodiments, the multiple CORESETs may have a set of TCI status identifiers.

In some embodiments, the multiple CORESETs may have a same control resource set pool CORESET POOL identifier or different CORESET POOL identifiers.

(2) Each piece of sub-search-space is associated with one CORESET.

In the condition of (2), the sub-search-space is search space, and the multiple pieces of sub-search-space are multiple pieces of search space. Each piece of search space is associated with one CORESET, and CORESETs associated with different pieces of search space can be the same or different.

In some embodiments, when each piece of sub-search-space includes each CORESET of multiple CORESETs and a monitoring occasion corresponding to each CORESET, that is, the foregoing (1), a candidate PDCCH set of each piece of sub-search-space may be determined according to at least one of the following:

an index of sub-search-space;

an index of a CORESET; or an index of a CORESET POOL.

In this embodiment of the present disclosure, a candidate PDCCH group in the foregoing candidate PDCCH group set may be constituted in at least one of the following manners.

(a) A candidate PDCCH is selected from a candidate PDCCH set in a single piece of sub-search-space to constitute the candidate PDCCH group.

For example, a candidate PDCCH is selected from a candidate PDCCH set of a piece of sub-search-space to constitute the candidate PDCCH group. In this case, the candidate PDCCH group includes one candidate PDCCH.

(b) According to a preset rule, a candidate PDCCH is selected from candidate PDCCH sets of multiple pieces of sub-search-space to constitute the candidate PDCCH group.

For example, according to the preset rule, a candidate PDCCH is selected from a candidate PDCCH set of each piece of sub-search-space to constitute the candidate PDCCH group. In this case, the candidate PDCCH group may include multiple candidate PDCCHs.

In some embodiments, the preset rule in the foregoing (b) may include at least one of the following:

(a) candidate PDCCHs with a same index in all or some of the multiple pieces of sub-search-space constitute the candidate PDCCH group;

(b) candidate PDCCHs with a same aggregation level in all or some of the multiple pieces of sub-search-space constitute the candidate PDCCH group;

(c) candidate PDCCHs in all or some of the multiple pieces of sub-search-space constitute the candidate PDCCH group based on any combination; or (d) candidate PDCCHs in all or some of the multiple pieces of sub-search-space constitute the candidate PDCCH group based on cyclic shift of a candidate PDCCH index.

For example, if three pieces of sub-search-space are configured for UE1, namely sub-search-space 1, sub-search-space 2, and sub-search-space 3, and a candidate PDCCH set of the sub-search-space 1 includes two candidate PDCCHs with an index of 0 and 1 respectively, a candidate PDCCH set of the sub-search-space 2 includes two candidate PDCCHs with an index of 0 and 1 respectively, and a candidate PDCCH set of the sub-search-space 3 includes four candidate PDCCHs with an index of 0, 1, 2 and 3 respectively, according to the foregoing preset rule (a), candidate PDCCHs with an index of 1 can be selected from candidate PDCCH sets of the three pieces of sub-search-space (that is, all sub-search-space) respectively to constitute the candidate PDCCH group; and in some embodiments, candidate PDCCHs with an index of 2 may be selected from candidate PDCCH sets of the sub-search-space 1 and sub-search-space 2 (that is, some pieces of the sub-search-space) respectively to constitute the candidate PDCCH group.

For another example, if three pieces of sub-search-space are configured for UE2, namely sub-search-space 1, sub-search-space 2, and sub-search-space 3, and a candidate PDCCH set of the sub-search-space 1 includes two candidate PDCCHs with aggregation levels of 1 and 4 respectively, a candidate PDCCH set of the sub-search-space 2 includes a candidate PDCCH with an aggregation level of 4, and a candidate PDCCH set of the sub-search-space 3 includes three candidate PDCCHs with aggregation levels of 1, 2 and 4 respectively, according to the foregoing preset rule (b), candidate PDCCHs with an aggregation level of 4 can be selected from candidate PDCCH sets of the three pieces of sub-search-space (that is, all sub-search-space) to constitute the candidate PDCCH group; candidate PDCCHs with an aggregation level of 1 are selected from candidate PDCCH sets of the sub-search-space 1 and sub-search-space 3 (that is, some pieces of the sub-search-space) respectively to constitute the candidate PDCCH group; or a candidate PDCCH with an aggregation level of 2 is selected from the candidate PDCCH set of the sub-search-space 3 (that is, some pieces of the sub-search-space) to constitute the candidate PDCCH group.

For still another example, if four pieces of sub-search-space are configured for UE3, namely sub-search-space 1, sub-search-space 2, sub-search-space 3, and sub-search-space 4, according to the foregoing preset rule (c), based on any combination, a candidate PDCCH is selected from candidate PDCCH sets of the four pieces of sub-search-space (that is, all sub-search-space) to constitute the candidate PDCCH group; or based on any combination, a candidate PDCCH can be selected from candidate PDCCH sets of the sub-search-space 1 and the sub-search-space 3 (that is, some pieces of the sub-search-space) to constitute the candidate PDCCH group.

For example, if three pieces of sab-search-space are configured for UE4, namely sub-search-space 1, sub-search-space 2, and sub-search-space 3, and a candidate PDCCH set of the sub-search-space 1 includes two candidate PDCCHs with an index of 0 and 1 respectively, a candidate PDCCH set of the sub-search-space 2 includes two candidate PDCCHs with an index of 0 and 1 respectively, and a candidate PDCCH set of the sub-search-space 3 includes four candidate PDCCHs with an index of 0, 1, 2 and 3 respectively, according to the foregoing preset rule (d), based on cyclic shift of a candidate PDCCH index, a candidate PDCCH with an index of 0 can be selected from a candidate PDCCH set of the sub-search-space 1, a candidate PDCCH with an index of 1 can be selected from a candidate PDCCH set of the sub-search-space 2, and a candidate PDCCH with an index of 2 can be selected from a candidate PDCCH set of the sub-search-space 3, to constitute the candidate PDCCH group.

In this embodiment of the present disclosure, to improve efficiency of blind detection, before step 101, the method may further include:

performing channel estimation on a candidate PDCCH group including multiple candidate PDCCHs in a candidate PDCCH group set in at least one of the following manners:

joint channel estimation is performed on candidate PDCCHs of the multiple pieces of sub-search-space;

channel estimation is performed according to a Demodulation Reference Signal (DMRS) of preset sub-search-space; or channel estimation is performed for a candidate PDCCH of each piece of sub-search-space.

It should be noted that the foregoing multiple pieces of candidate PDCCHs correspond to the multiple pieces of sub-search-space respectively, that is, a candidate PDCCH group including the multiple candidate PDCCHs corresponds to the multiple pieces of sub-search-space. The foregoing preset sub-search-space may be preset based on actual requirements, for example, the foregoing preset sub-search-space may be sub-search-space with the smallest or largest index or may be first sub-search-space or last sub-search-space in a time domain. The joint channel estimation or channel estimation may be performed in an existing manner, which is not limited in this embodiment.

In some embodiments, to improve reliability of blind detection, when the terminal performs blind detection of information on a candidate PDCCH group including multiple candidate PDCCHs in a candidate PDCCH group set, information decoding with soft combining can be performed. For example, when the terminal performs blind detection of a single piece of DCI on a candidate PDCCH group including multiple candidate PDCCHs, DCI decoding with soft combining can be performed.

In some embodiments, to reduce processing overhead for the terminal, when the terminal detects corresponding information on a first candidate PDCCH group of a candidate PDCCH group set, the terminal can stop blind detection on a second candidate PDCCH group. The second candidate PDCCH group is a candidate PDCCH group including the first candidate PDCCH group in the candidate PDCCH group set.

In some embodiments, if the terminal detects DCI on a third candidate PDCCH group in the candidate PDCCH group set, when a transmission timeline for DCI scheduling is calculated, an applied PDCCH end symbol may be any one of the following:

a last symbol of multiple pieces of sub-search-space corresponding to the third candidate PDCCH group;

a last symbol of a monitoring occasion included in multiple pieces of sub-search-space corresponding to the third candidate PDCCH group; or a last symbol of a candidate PDCCH group including the third candidate PDCCH group.

This way, with the used PDCCH end symbol, sufficient transmission preparation time can be provided for transmission of DCI scheduling.

In an implementation manner, the transmission of DCI scheduling may be Physical Uplink Shared Channel (PUSCH) transmission, or cross-carrier scheduling transmission. The transmission timeline for the DCI scheduling can be calculated in an existing manner, which is not limited in this embodiment.

In some embodiments, if the terminal detects DCI on a fourth candidate PDCCH group including multiple candidate PDCCHs in a candidate PDCCH group set, when a feedback resource of downlink transmission of the DCI scheduling (such as Physical Downlink Shared Channel (PDSCH) transmission), an index of a referenced Control Channel Element (CCE) can be any of the following:

a preset CCE index (for example, a first CCE index or a last CCE index) of a preset PDCCH (for example, a PDCCH detected on a CORESET with a smallest index) in the fourth candidate PDCCH group; and a value obtained by processing a preset CCE index (for example, a first CCE index or a last CCE index) on all PDCCHs or some PDCCHs in the fourth candidate PDCCH group according to a first preset function. For example, the first preset function may be a function for obtaining a minimum value or may be a function for obtaining a maximum value.

In some embodiments, a referenced quantity of CCEs is any one of the following:

a preset quantity of CCEs (for example, a quantity of first CCEs or a quantity of last CCEs) of a preset PDCCH (for example, a PDCCH detected on a CORESET with a smallest index) in the fourth candidate PDCCH group; and a value obtained by processing a preset quantity of CCEs (for example, a quantity of first CCEs or a quantity of last CCEs) on all PDCCHs or some PDCCHs in the fourth candidate PDCCH group according to a second preset function. For example, the second preset function may be a function for obtaining a minimum value, a function for obtaining a maximum value, or a function for obtaining an average value.

In an implementation manner, downlink transmission of the DCI scheduling may be PDSCH transmission, and a corresponding feedback resource is a Physical Uplink Control Channel (PUCCH) resource. The feedback resource for the downlink transmission of the DCI scheduling can be calculated in an existing manner, which is not limited in this embodiment.

Embodiments of the present disclosure will be described below with reference to FIG. 2 and FIG. 3.

Embodiment 1

It is assumed that N CORESETs are associated in configuration of a single piece of search space, and the N CORESETs and configured N monitoring occasions constitute N pieces of sub-search-space. A unified aggregation level and a quantity of candidate PDCCHs for each aggregation level are configured for each piece of sub-search-space, that is, configuration is performed in this search space. In this case, a candidate PDCCH in each piece of sub-search-space corresponds to an index $mL=0, 1, \ldots, M_L$, that is, an index of a candidate PDCCH is configured correspondingly when the aggregation level is L. A candidate PDCCH group independently constituted by candidate PDCCHs of each piece of sub-search-space and a candidate PDCCH group constituted by candidate PDCCHs with a same index and a same aggregation level of each piece of sub-search-space are candidate PDCCH groups for transmitting same DCI. For candidate PDCCH groups whose quantity of candidate PDCCHs is greater than 1, soft information combining is performed to decode DCI. In this case, a quantity of blind detection performed by the terminal in the search space is (N+1)*M, where M is a quantity of candidate PDCCHs in each piece of sub-search-space.

As shown in FIG. 2, if N is equal to 2, constituted sub-search-space includes Sub-SS1 and Sub-SS2, and correspondingly constituted candidate PDCCH groups include candidate PDCCH group 1, candidate PDCCH group 2, and candidate PDCCH group 3:

when the terminal detects the DCI on the candidate PDCCH group 1, the terminal does not need to continue performing detection on the candidate PDCCH group 3 which includes the candidate PDCCH group 1, that is, the terminal does not need to perform monitoring on the candidate PDCCH group 3. In addition, when a transmission timeline for the DCI scheduling is calculated, an applied PDCCH end symbol is a last symbol of the two pieces of sub-search-space, that is, Symbol #3. For example, the PDCCH end symbol is used in subsequent calculation for a timeline of PUSCH preparation time and calculation for a timeline of cross-carrier scheduling.

When the terminal detects the DCI on the candidate PDCCH group 2, and a feedback PUCCH resource of a PDSCH for the DCI scheduling is calculated, a referenced PDCCH may be a first PDCCH, that is, an associated CCE index and a quantity of CCEs are a first CCE index and a quantity of CCEs of the first PDCCH. The associated CCE index and the quantity of CCEs are used in subsequent calculation of a PUCCH resource.

Embodiment 2

It is assumed that N CORESETs are associated in configuration of a single piece of search space, and the N CORESETs and configured N monitoring occasions constitute N pieces of sub-search-space. A unified aggregation level and a quantity of candidate PDCCHs for each aggregation level are configured for each piece of sub-search-space, that is, configuration is performed in this search space. In this case, a candidate PDCCH in each piece of sub-search-space corresponds to an index $m_L = 0, 1, \ldots, M_L$, that is, an index of a candidate PDCCH is configured correspondingly when the aggregation level is L. A candidate PDCCH group constituted by candidate PDCCHs with a same index and a same aggregation level of each piece of sub-search-space is a candidate PDCCH group for transmitting the same DCI, and soft information combining is performed in these candidate PDCCH groups to decode the DCI. In this case, a quantity of blind detection performed by the terminal in the search space is M, where M is a quantity of candidate PDCCHs in each piece of sub-search-space.

As shown in FIG. 3, if N is equal to 2, constituted sub-search-space includes Sub-SS1 and Sub-SS2, and correspondingly constituted candidate PDCCH groups include candidate PDCCH group 1 and candidate PDCCH group 2:

when the terminal detects the DCI on the candidate PDCCH group 2, and a feedback PUCCH resource of a PDSCH for the DCI scheduling is calculated, a referenced PDCCH may be a first PDCCH, that is, an associated CCE index and a quantity of CCEs are a first CCE index and a quantity of CCEs of the first PDCCH. The associated CCE index and the quantity of CCEs are used in subsequent calculation of a PUCCH resource.

Referring to FIG. 4, FIG. 4 is a flowchart of an information sending method according to an embodiment of the present disclosure. The method is applied to a network device. As shown in FIG. 4, the method includes the following steps.

Step 401: Send information to a terminal by using a candidate PDCCH group set.

In some embodiments, the candidate PDCCH group set may be determined according to a candidate PDCCH set of each of multiple pieces of sub-search-space configured for the terminal. The candidate PDCCH group set may include one or more candidate PDCCH groups. A candidate PDCCH group included in the candidate PDCCH group set may include one candidate PDCCH, or may include multiple candidate PDCCHs.

In the information sending method according to this embodiment of the present disclosure, the network device can send information to the terminal by using the candidate PDCCH group set, the candidate PDCCH group set is determined according to a candidate PDCCH set of each of the multiple pieces of sub-search-space configured for the terminal. Therefore, the network device can perform repeated sending of information on multiple PDCCHs, thereby improving reliability of PDCCH transmission.

In some embodiments, step 401 may include: sending DCI to the terminal by using the candidate PDCCH group set.

In some embodiments, each piece of sub-search-space is constituted by each CORESET of multiple CORESETs and a monitoring occasion corresponding to each CORESET, and the multiple CORESETs are associated with a single piece of search space;

or each piece of sub-search-space is associated with one CORESET.

In some embodiments, the multiple CORESETs have a same TCI status identifier, or the multiple CORESETs have a group of TCI status identifiers;

or the multiple CORESETs have a same CORESET POOL identifier or different CORESET POOL identifiers.

In some embodiments, when each piece of sub-search-space includes each CORESET of multiple CORESETs and a monitoring occasion corresponding to each CORESET, a candidate PDCCH set of each piece of sub-search-space is determined according to at least one of the following:

an index of sub-search-space;
an index of a CORESET; or
an index of a CORESET POOL.

In some embodiments, a candidate PDCCH group in the candidate PDCCH group set is constituted in at least one of the following manners:

a candidate PDCCH is selected from a candidate PDCCH set in a single piece of sub-search-space to constitute the candidate PDCCH group; and according to a preset rule, a candidate PDCCH is selected from candidate PDCCH sets of the multiple pieces of sub-search-space to constitute the candidate PDCCH group.

In some embodiments, the preset rule includes at least one of the following:

candidate PDCCHs with a same index in all or some of the multiple pieces of sub-search-space constitute the candidate PDCCH group;

candidate PDCCHs with a same aggregation level in all or some of the multiple pieces of sub-search-space constitute the candidate PDCCH group;

candidate PDCCHs in all or some of the multiple pieces of sub-search-space constitute the candidate PDCCH group based on any combination; or candidate PDCCHs in all or some of the multiple pieces of sub-search-space constitute the candidate PDCCH group based on cyclic shift of a candidate PDCCH index.

Referring to FIG. 5, FIG. 5 is a schematic structural diagram of a terminal according to an embodiment of the present disclosure. As shown in FIG. 5, a terminal 50 includes:

a detecting module 51, configured to perform blind detection of information in a candidate PDCCH group set.

The candidate PDCCH group set is determined according to a candidate PDCCH set of each of multiple pieces of sub-search-space configured for the terminal 50.

In some embodiments, the detecting module 51 may be configured to perform blind detection of a single piece of DCI in the candidate PDCCH group set.

In some embodiments, each piece of sub-search-space is constituted by each CORESET of multiple CORESETs and a monitoring occasion corresponding to each CORESET, and the multiple CORESETs are associated with a single piece of search space;

or each of the multiple pieces of sub-search-space is associated with one CORESET.

In some embodiments, the multiple CORESETs have a same TCI status identifier, or the multiple CORESETs have a group of TCI status identifiers;

or the multiple CORESETs have a same CORESET POOL identifier or different CORESET POOL identifiers.

In some embodiments, when each piece of sub-search-space includes each CORESET of multiple CORESETs and a monitoring occasion corresponding to each CORESET, a candidate PDCCH set of each piece of sub-search-space is determined according to at least one of the following:

an index of sub-search-space;

an index of a CORESET; or an index of a CORESET POOL.

In some embodiments, a candidate PDCCH group in the candidate PDCCH group set is constituted in at least one of the following manners:

a candidate PDCCH is selected from a candidate PDCCH set in a single piece of sub-search-space to constitute the candidate PDCCH group; and according to a preset rule, a candidate PDCCH is selected from candidate PDCCH sets of the multiple pieces of sub-search-space to constitute the candidate PDCCH group.

In some embodiments, the preset rule includes at least one of the following:

candidate PDCCHs with a same index in all or some of the multiple pieces of sub-search-space constitute the candidate PDCCH group;

candidate PDCCHs with a same aggregation level in all or some of the multiple pieces of sub-search-space constitute the candidate PDCCH group;

candidate PDCCHs in all or some of the multiple pieces of sub-search-space constitute the candidate PDCCH group based on any combination; or candidate PDCCHs in all or some of the multiple pieces of sub-search-space constitute the candidate PDCCH group based on cyclic shift of a candidate PDCCH index.

In some embodiments, the terminal 50 further includes:

an information estimating module, configured to perform channel estimation on a candidate PDCCH group including multiple candidate PDCCHs in the candidate PDCCH group set in at least one of the following manners:

joint channel estimation is performed on candidate PDCCHs of the multiple pieces of sub-search-space;

channel estimation is performed according to a demodulation reference signal DMRS of a preset piece of sub-search-space; or channel estimation is performed for a candidate PDCCH of each piece of sub-search-space.

The multiple candidate PDCCHs respectively correspond to the multiple pieces of sub-search-space.

In some embodiments, the terminal 50 further includes:

a processing module, configured to perform information decoding with soft combining, when blind detection of information is performed on a candidate PDCCH group including multiple candidate PDCCHs in the candidate PDCCH group set.

In some embodiments, the processing module may be further configured to:

stop blind detection on a second candidate PDCCH group when the information is detected on a first candidate PDCCH group in the candidate PDCCH group set.

The second candidate PDCCH group is a candidate PDCCH group including the first candidate PDCCH group in the candidate PDCCH group set.

In some embodiments, if DCI is detected on a third candidate PDCCH group in the candidate PDCCH group set, when a transmission timeline for the DCI scheduling is used, an applied PDCCH end symbol may be any one of the following:

a last symbol of multiple pieces of sub-search-space corresponding to the third candidate PDCCH group;

a last symbol of a monitoring occasion included in multiple pieces of sub-search-space corresponding to the third candidate PDCCH group; or a last symbol of a candidate PDCCH group including the third candidate PDCCH group.

In some embodiments, if DCI is detected on a fourth candidate PDCCH group including multiple candidate PDCCHs in the candidate PDCCH group set, when a feedback resource of downlink transmission for the DCI scheduling is calculated, a referenced control channel element CCE index is any one of the following:

a preset CCE index of a preset PDCCH in the fourth candidate PDCCH group; and a value obtained by processing a preset CCE index on all PDCCHs or some PDCCHs in the fourth candidate PDCCH group according to a first preset function.

In some embodiments, a referenced quantity of CCEs is any one of the following:

a preset quantity of CCEs of a preset PDCCH in the fourth candidate PDCCH group; and a value obtained by processing a preset quantity of CCEs on all PDCCHs or some PDCCHs in the fourth candidate PDCCH group according to a second preset function.

The terminal 50 provided by the embodiments of the present disclosure may implement processes implemented in the method embodiment shown in FIG. 1. To avoid repetition, details are not described herein again.

Referring to FIG. 6, FIG. 6 is a schematic structural diagram of a network device according to an embodiment of the present disclosure. As shown in FIG. 6, a network device 60 includes:

a sending module 61, configured to send information to a terminal by using a candidate PDCCH group set.

In some embodiments, the candidate PDCCH group set may be determined according to a candidate PDCCH set of each of multiple pieces of sub-search-space configured for the terminal. The candidate PDCCH group set may include one or more candidate PDCCH groups. A candidate PDCCH group included in the candidate PDCCH group set may include one candidate PDCCH, or may include multiple candidate PDCCHs.

In some embodiments, the sending module 61 may be configured to send DCI to a terminal by using a candidate PDCCH group set.

In some embodiments, each piece of sub-search-space is constituted by each CORESET of multiple CORESETs and a monitoring occasion corresponding to each CORESET, and the multiple CORESETs are associated with a single piece of search space;

or each piece of sub-search-space is associated with one CORESET.

In some embodiments, the multiple CORESETs have a same TC status identifier, or the multiple CORESETs have a group of TCI status identifiers;

or the multiple CORESETs have a same CORESET POOL identifier or different CORESET POOL identifiers.

In some embodiments, when each piece of sub-searchspace includes each CORESET of multiple CORESETs and a monitoring occasion corresponding to each CORESET, a candidate PDCCH set of each piece of sub-search-space is determined according to at least one of the following:

an index of sub-search-space;

an index of a CORESET; or an index of a CORESET POOL

In some embodiments, a candidate PDCCH group in the candidate PDCCH group set is constituted in at least one of the following manners:

a candidate PDCCH is selected from a candidate PDCCH set in a single piece of sub-search-space to constitute the candidate PDCCH group; and according to a preset rule, a candidate PDCCH is selected from candidate PDCCH sets of the multiple pieces of sub-search-space to constitute the candidate PDCCH group.

In some embodiments, the preset rule includes at least one of the following:

candidate PDCCHs with a same index in all or some of the multiple pieces of sub-search-space constitute the candidate PDCCH group;

candidate PDCCHs with a same aggregation level in all or some of the multiple pieces of sub-search-space constitute the candidate PDCCH group;

candidate PDCCHs in all or some of the multiple pieces of sub-search-space constitute the candidate PDCCH group based on any combination; or candidate PDCCHs in all or some of the multiple pieces of sub-search-space constitute the candidate PDCCH group based on cyclic shift of a candidate PDCCH index.

The network device 60 provided by the embodiments of the present disclosure may implement processes implemented by the method embodiment shown in FIG. 4. To avoid repetition, details are not described herein again.

An embodiment of the present disclosure further provides a communications device, including a processor, a memory, and a computer program that is stored in the memory and that can be run on the processor, where when the computer program is executed by the processor, each process of the method embodiment shown in FIG. 1 or FIG. 4 can be implemented. To avoid repetition, details are not described herein again. In some embodiments, the communications device may be a terminal or a network device.

Figure 7:
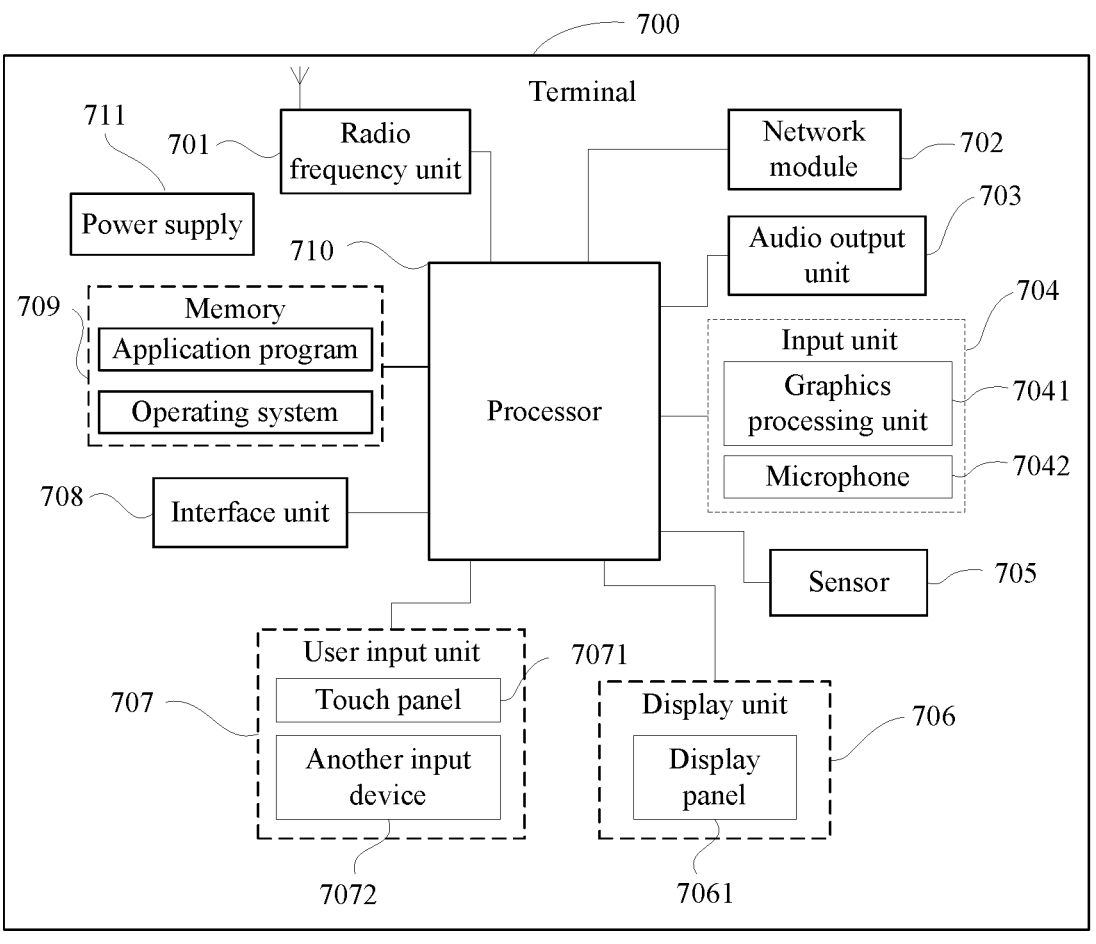
FIG. 7 is a second schematic structural diagram of the terminal according to an embodiment of the present disclosure.

Referring to FIG. 7, FIG. 7 is a schematic diagram of a hardware structure of a terminal for implementing the embodiments of the present disclosure. The terminal 700 includes but is not limited to: components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that a structure of the terminal shown in FIG. 7 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 710 is configured to perform blind detection of information in a candidate PDCCH group set. The candidate PDCCH group set is determined according to a candidate PDCCH set of each of multiple pieces of subsearch-space configured for the terminal 700.

The terminal 700 provided by the embodiments of the present disclosure may implement processes implemented in the method embodiment shown in FIG. 1. To avoid repetition, details are not described herein again.

It should be understood that, in this embodiment of the present disclosure, the radio frequency unit 701 may be configured to receive and send information or receive and send a signal in a call process. In some embodiments, after downlink data from a base station is received, the processor 710 processes the downlink data. In addition, uplink data is sent to the base station. Usually, the radio frequency unit 701 includes but is not limited to an antenna, at least one amplifier, a transceiver, a coupler, a low noise amplifier, a duplexer, and the like. In addition, the radio frequency unit 701 may further communicate with a network and another device through a wireless communications system.

The terminal provides wireless broadband Internet access to a user through the network module 702, for example, helps the user receive and send e-mails, browse web pages, access streaming media, and the like.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received voice, or a message received voice) related to a specific function implemented by the terminal 700. The audio output unit 703 includes a speaker, a buzzer, a telephone receiver, and the like.

The input unit 704 is configured to receive an audio signal or a video signal. The input unit 704 may include a Graphics Processing Unit (GPU) 7041 and a microphone 7042. The graphics processing unit 7041 processes image data of a static image or video obtained by an image capture apparatus (such as, a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive a sound and can process such sound into audio data. Processed audio data may be converted, in a call mode, into a format that can be sent to a mobile communication base station by using the radio frequency unit 701 for output.

The terminal 700 further includes at least one sensor 705, for example, a light sensor, a motion sensor, and another sensor. In some embodiments, the light sensor includes an ambient light sensor and a proximity sensor. The ambient light sensor may adjust luminance of the display panel 7061 based on brightness of ambient light. The proximity sensor may turn off the display panel 7061 and/or backlight when the terminal 700 is moved to an ear. As a type of the motion sensor, an accelerometer sensor may detect magnitude of acceleration in each direction (generally, on three axes), and may detect magnitude and a direction of gravity when being static. The accelerometer sensor may be configured to recognize a terminal gesture (for example, portrait and landscape orientation switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by a user or information provided for a user. The display unit 706 may include a display panel 7061. The display panel 7061 may be configured in a form of a Liquid Crystal Display (LCD), an Organic Light-Emitting Diode (OLED), or the like.

The user input unit 707 may be configured to receive input digit or character information and generate key signal input related to user setting and function control of the terminal. In some embodiments, the user input unit 707 includes a touch panel 7071 and another input device 7072. The touch panel 7071 is also referred to as a touchscreen, and may collect a touch operation performed by a user on or near the touch panel 7071 (such as an operation performed by a user on or near the touch panel 7071 by using any proper object or accessory, such as a finger or a stylus). The touch panel 7071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 7071 may be implemented by using multiple types such as a resistive type, a capacitive type, an infrared ray, and a surface acoustic wave. The user input unit 707 may include other input devices 7072 in addition to the touch panel 7071. In some embodiments, the another input device 7072 may include but is not limited to: a physical keyboard, a function button (such as a volume control button, a switch button), a trackball, a mouse, and a joystick, which is not described herein.

Further, the touch panel 7071 can cover the display panel 7061. When detecting a touch operation on or near the touch panel, the touch panel 7071 transmits the touch operation to the processor 710 to determine a type of a touch event. Then the processor 710 provides corresponding visual output on the display panel 7061 based on the type of the touch event. In FIG. 7, the touch panel 7071 and the display panel 7061 are used as two independent components to implement input and output functions of the terminal. However, in some embodiments, the touch panel 7071 and the display panel 7061 may be integrated to implement the input and output functions of the terminal. This is not specifically limited herein.

The interface unit 708 is an interface connecting an external apparatus to the terminal 700. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 708 may be configured to receive input (for example, data information and power) from the external apparatus and transmit the received input to one or more elements in the terminal 700, or may be configured to transmit data between the terminal 700 and the external apparatus.

The memory 709 may be configured to store a software program and various pieces of data. The memory 709 may mainly include a program storage area and a data storage area. The program storage area may store an operating system, an application required for at least one function (for example, a sound play function or an image display function), and the like. The data storage area may store data (for example, audio data or an address book) or the like created based on use of the mobile phone. In addition, the memory 709 may include a high-speed random access memory, and may further include a nonvolatile memory, for example, at least one magnetic disk storage device, a flash storage device, or another volatile solid-state storage device.

The processor 710 is a control center of the terminal, and connects all parts of the entire terminal by using various interfaces and lines. By running or executing a software program and/or a module stored in the memory 709 and invoking data stored in the memory 709, the processor performs various functions of the terminal and data processing, to perform overall monitoring on the terminal. The processor 710 may include one or more processing units. For example, the processor 710 may be integrated with an application processor and a modem processor. The application processor mainly processes an operating system, a user interface, an application program, and the like. The modem processor mainly processes wireless communication. It can be understood that, for example, the modem processor may not be integrated into the processor 710.

The terminal 700 may further include a power supply 711 (such as a battery) that supplies power to each component. For example, the power supply 711 may be logically connected to the processor 710 by using a power management system, to implement functions such as charging, discharging, and power consumption management by using the power management system.

In addition, the terminal 700 may further include some function modules not shown, and details are not described herein.

Figure 8:
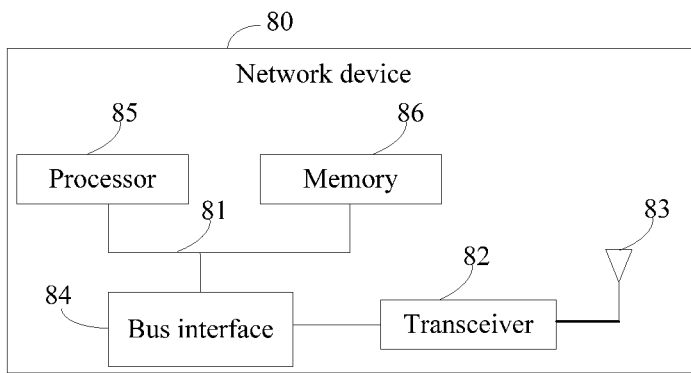
FIG. 8 is a second schematic structural diagram of the network device according to an embodiment of the present disclosure.

Referring to FIG. 8, FIG. 8 is a schematic diagram of a hardware structure of a network device for implementing the embodiments of the present disclosure. The network device 80 includes but is not limited to a bus 81, a transceiver 82, an antenna 83, a bus interface 84, a processor 85, and a memory 86.

In this embodiment of the present disclosure, the network device 80 further includes a computer program that is stored in the memory 86 and that can be run on the processor 85. When the computer program is executed by the processor 85, the following steps are implemented:

sending information to a terminal by using a candidate PDCCH group set, where the candidate PDCCH group set is determined according to a candidate PDCCH set of each of multiple pieces of sub-search-space configured for the terminal.

The transceiver 82 is configured to receive and send data under the control of the processor 85.

The network device 80 provided by the embodiments of the present disclosure may implement processes implemented by the method embodiment shown in FIG. 4. To avoid repetition, details are not described herein again.

In FIG. 8, for a bus architecture (represented by a bus 81), the bus 81 may include any quantity of interconnecting buses and bridges, and the bus 81 interconnects various circuits of one or more processors represented by the processor 85 and a memory represented by the memory 86. The bus 81 may further link various other circuits together, such as a peripheral device, a voltage regulator, and a power management circuit. These are all well known in the art. Therefore, this specification provides no further description. The bus interface 84 provides an interface between the bus 81 and the transceiver 82. The transceiver 82 may be one component or multiple components, for example, multiple receivers and transmitters, and provide a unit that is configured to communicate with various other apparatuses on a transmission medium. Data processed by the processor 85 is transmitted on a wireless medium by using the antenna 83. Further, the antenna 83 further receives data and transmits the data to the processor 85.

The processor 85 is responsible for managing the bus 81 and general processing, and may further provide various functions, including timing, peripheral interfacing, voltage regulation, power management, and another control function. The memory 86 may be configured to store data used by the processor 85 when performing an operation.

In some embodiments, the processor 85 may be a CPU, an ASIC, an FPGA, or a Complex Programmable Logic Device (CPLD).

An embodiment of the present disclosure further provides a computer-readable storage medium. The computer-readable storage medium stores a computer program, and when a processor executes the computer program, each process in the method embodiment shown in FIG. 1 or FIG. 4 is implemented, and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

A person of ordinary skill in the art may realize that units and algorithm steps of various examples described with reference to the embodiments disclosed in this specification can be implemented by using electronic hardware, or a combination of computer software and the electronic hardware. Whether these functions are performed by using hardware or software depends on a specific application and design constraints of the technical solutions. A person of ordinary skill in the art may use different methods to achieve the described functions for each particular application, but it should not be considered that the implementation goes beyond the scope of the present disclosure.

A person of ordinary skill in the art may clearly understand that, for convenient and simple description, for the specific working processes of the system, apparatus, and unit described above, reference may be made to a corresponding process in the foregoing method embodiments, and details are not described herein again.

In the embodiments provided in this application, it should be understood that the disclosed apparatus and method may be implemented in other manners. For example, the apparatus embodiment described above is only an example. For example, division into the units is only logical function division. There may be other division manners in actual implementation, for example, multiple units or components may be combined or integrated into another system, or some features may be ignored or not implemented. In addition, the displayed or discussed mutual couplings or direct couplings or communication connections may be implemented by using some interfaces. The indirect couplings or communication connections between apparatuses or units may be implemented in electronic, mechanical, or other forms.

The units described as separate parts may or may not be physically separate, and parts displayed as units may or may not be physical units, that is, may be located in one location, or may be distributed on multiple network units. Some or all of the units may be selected according to actual needs to achieve the objective of the solutions of the embodiments.

In addition, function units in the embodiments of the present disclosure may be integrated into one processing unit, or each of the units may exist alone physically, or two or more units are integrated into one unit.

Based on the descriptions of the foregoing implementation manners, a person skilled in the art may clearly understand that the method in the foregoing embodiment may be implemented by software in addition to a necessary universal hardware platform or by hardware only. In most circumstances, the former is an implementation manner. Based on such understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to perform the methods described in the embodiments of the present disclosure.

A person of ordinary skill in the art can understand that all or some of the procedures in the methods of the foregoing embodiments may be implemented by a computer program controlling related hardware. The program may be stored in a computer-readable storage medium. When the program is executed, the procedures of the embodiments of the foregoing methods may be performed. The storage medium includes a magnetic disk, a compact disc, a ROM, a RAM, or the like.

It can be understood that the embodiments described in the present disclosure may be implemented by hardware, software, firmware, middleware, microcode, or a combination thereof. For implementation with hardware, modules, units, and subunits may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general-purpose processor, a controller, a microcontroller, a microprocessor, another electronic unit for implementing the functions of the present disclosure, or a combination thereof.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of the present disclosure are described with reference to the accompanying drawings. However, the present disclosure is not limited to the foregoing specific implementation manners. The foregoing implementation manners are merely examples, but are not limiting. A person of ordinary skill in the art may make many forms without departing from the objective and the scope of the claims of the present disclosure, and these forms all fall within the protection scope of the present disclosure.

The invention claimed is:

1. An information detection method, performed by a terminal, comprising:

performing blind detection of information in a candidate Physical Downlink Control Channel (PDCCH) group set, wherein the candidate PDCCH group set is determined according to a candidate PDCCH set of each of multiple pieces of sub-search-space configured for the terminal, wherein all PDCCH groups in the candidate PDCCH group set carry a same piece of Downlink Control Information (DCI), wherein when a DCI is detected on a third candidate PDCCH group in the candidate PDCCH group set, a PDCCH end symbol used in a calculation of transmission timeline for DCI scheduling is any one of the following:

a last symbol of monitoring occasions comprised in multiple sub-search-spaces corresponding to the third candidate PDCCH group; or a last symbol of the third candidate PDCCH group.

2. The information detection method according to claim 1, wherein the performing blind detection of information in a candidate PDCCH group set comprises:

performing blind detection of the same piece of DCI in the candidate PDCCH group set.

3. The information detection method according to claim 1, wherein the performing blind detection of information in a candidate PDCCH group set comprises:

performing repeated reception of information on multiple PDCCHs in at least one candidate PDCCH group.

4. The information detection method according to claim 1, wherein a candidate PDCCH group in the candidate PDCCH group set is constituted in at least one of the following manners:

selecting a candidate PDCCH from a candidate PDCCH set in a single piece of sub-search-space to constitute the candidate PDCCH group; or according to a preset rule, selecting a candidate PDCCH from candidate PDCCH sets of the multiple pieces of sub-search-space to constitute the candidate PDCCH group.

5. The information detection method according to claim 4, wherein the preset rule comprises at least of the following:

candidate PDCCHs with a same index in all or some of the multiple pieces of sub-search-space to constitute the candidate PDCCH group;

candidate PDCCHs with a same aggregation level in all or some of the multiple pieces of sub-search-space to constitute the candidate PDCCH group;

candidate PDCCHs in all or some of the multiple pieces of sub-search-space to constitute the candidate PDCCH group based on any combination; or candidate PDCCHs in all or some of the multiple pieces of sub-search-space to constitute the candidate PDCCH group based on cyclic shift of a candidate PDCCH index.

6. The information detection method according to claim 1, wherein if DCI is detected on a first candidate PDCCH group comprising multiple candidate PDCCHs in the candidate PDCCH group set, when a feedback resource of downlink transmission for DCI scheduling is calculated, a referenced Control Channel Element (CCE) index is any one of the following:

a preset CCE index of a preset PDCCH in the first candidate PDCCH group; or a value obtained by processing a preset CCE index on all PDCCHs or some PDCCHs in the fourth candidate PDCCH group according to a first preset function, or a referenced quantity of CCEs is any one of the following:

a preset quantity of CCEs of a preset PDCCH in the first candidate PDCCH group; or a value obtained by processing a preset quantity of CCEs on all PDCCHs or some PDCCHs in the first candidate PDCCH group according to a second preset function.

7. A network device, comprising:

a memory storing a computer program; and a processor coupled to the memory and configured to execute the computer program, wherein the computer program, when executed by the processor, causes the processor to perform:

sending information to a terminal by using a candidate Physical Downlink Control Channel (PDCCH) group set, wherein the candidate PDCCH group set is determined according to a candidate PDCCH set of each of multiple pieces of sub-search-space configured for the terminal, wherein all PDCCH groups in the candidate PDCCH group set carry a same piece of Downlink Control Information (DCI), wherein when a DCI is detected on a third candidate PDCCH group in the candidate PDCCH group set, a PDCCH end symbol used in a calculation of transmission timeline for DCI scheduling is any one of the following:

a last symbol of monitoring occasions comprised in multiple sub-search-spaces corresponding to the third candidate PDCCH group; or a last symbol of the third candidate PDCCH group.

8. The network device according to claim 7, wherein the sending information to a terminal comprises: sending DCI to the terminal.

9. The network device according to claim 7, wherein each piece of sub-search-space is constituted by each Control Resource Set (CORESET) of multiple CORESETs and a monitoring occasion corresponding to each CORESET, and the multiple CORESETs are associated with a single piece of search space;

or each of the multiple pieces of sub-search-space is associated with one CORESET.

10. The network device according to claim 9, wherein when each piece of sub-search-space is constituted by each CORESET of the multiple CORESETs and the monitoring occasion corresponding to each CORESET, a candidate PDCCH set of each piece of sub-search-space is determined according to at least one of the following:

an index of sub-search-space;

an index of a CORESET; or an index of a CORESET POOL.

11. The network device according to claim 7, wherein a candidate PDCCH group in the candidate PDCCH group set is constituted in at least one of the following manners:

selecting a candidate PDCCH from a candidate PDCCH set in a single piece of sub-search-space to constitute the candidate PDCCH group; or according to a preset rule, selecting a candidate PDCCH from candidate PDCCH sets of the multiple pieces of sub-search-space to constitute the candidate PDCCH group.

12. The network device according to claim 11, wherein the preset rule comprises at least of the following:

candidate PDCCHs with a same index in all or some of the multiple pieces of sub-search-space to constitute the candidate PDCCH group;

candidate PDCCHs with a same aggregation level in all or some of the multiple pieces of sub-search-space to constitute the candidate PDCCH group;

candidate PDCCHs in all or some of the multiple pieces of sub-search-space to constitute the candidate PDCCH group based on any combination; or candidate PDCCHs in all or some of the multiple pieces of sub-search-space to constitute the candidate PDCCH group based on cyclic shift of a candidate PDCCH index.

13. A communications device, comprising: a memory, a processor, and a computer program that is stored in the memory, wherein the computer program, when executed by the processor, causes the processor to perform:

performing blind detection of information in a candidate Physical Downlink Control Channel (PDCCH) group set, wherein the candidate PDCCH group set is determined according to a candidate PDCCH set of each of multiple pieces of sub-search-space configured for the terminal, wherein all PDCCH groups in the candidate PDCCH group set carry a same piece of Downlink Control Information (DCI), wherein when a DCI is detected on a third candidate PDCCH group in the candidate PDCCH group set, a PDCCH end symbol used in a calculation of transmission timeline for DCI scheduling is any one of the following:

a last symbol of monitoring occasions comprised in multiple sub-search-spaces corresponding to the third candidate PDCCH group; or a last symbol of the third candidate PDCCH group.

14. The communications device according to claim 13, wherein the performing blind detection of information in a candidate PDCCH group set comprises:

performing blind detection of the same piece of DCI in the candidate PDCCH group set.

15. The communications device according to claim 13, wherein the performing blind detection of information in a candidate PDCCH group set comprises:

performing repeated reception of information on multiple PDCCHs in at least one candidate PDCCH group.

16. The communications device according to claim 13, wherein a candidate PDCCH group in the candidate PDCCH group set is constituted in at least one of the following manners:

selecting a candidate PDCCH from a candidate PDCCH set in a single piece of sub-search-space to constitute the candidate PDCCH group; or according to a preset rule, selecting a candidate PDCCH from candidate PDCCH sets of the multiple pieces of sub-search-space to constitute the candidate PDCCH group.

17. The communications device according to claim 16, wherein the preset rule comprises at least of the following:

candidate PDCCHs with a same index in all or some of the multiple pieces of sub-search-space to constitute the candidate PDCCH group;

candidate PDCCHs with a same aggregation level in all or some of the multiple pieces of sub-search-space to constitute the candidate PDCCH group;

candidate PDCCHs in all or some of the multiple pieces of sub-search-space to constitute the candidate PDCCH group based on any combination; or candidate PDCCHs in all or some of the multiple pieces of sub-search-space to constitute the candidate PDCCH group based on cyclic shift of a candidate PDCCH index.

18. The communications device according to claim 13, wherein if DCI is detected on a first candidate PDCCH group comprising multiple candidate PDCCHs in the candidate PDCCH group set, when a feedback resource of downlink transmission for DCI scheduling is calculated, a referenced Control Channel Element (CCE) index is any one of the following:

a preset CCE index of a preset PDCCH in the first candidate PDCCH group; or a value obtained by processing a preset CCE index on all PDCCHs or some PDCCHs in the fourth candidate PDCCH group according to a first preset function, or a referenced quantity of CCEs is any one of the following:

a preset quantity of CCEs of a preset PDCCH in the first candidate PDCCH group; or a value obtained by processing a preset quantity of CCEs on all PDCCHs or some PDCCHs in the first candidate PDCCH group according to a second preset function.

* * * * *